United States Patent
Zhou et al.

(10) Patent No.: US 12,526,066 B2
(45) Date of Patent: Jan. 13, 2026

(54) SYNCHRONIZATION FOR MULTI-SENSOR SYSTEMS

(71) Applicant: Black Sesame Technologies Inc., San Jose, CA (US)

(72) Inventors: Ying Zhou, Cupertino, CA (US); Bintian Zhou, Shanghai (CN)

(73) Assignee: Black Sesame Technologies Inc., San Jose, CA (US)

( * ) Notice: Subject to any disclaimer, the term of this patent is extended or adjusted under 35 U.S.C. 154(b) by 490 days.

(21) Appl. No.: 18/322,509

(22) Filed: May 23, 2023

(65) Prior Publication Data
US 2024/0313876 A1    Sep. 19, 2024

(30) Foreign Application Priority Data
Mar. 13, 2023    (CN) .......................... 202310266388.9

(51) Int. Cl.
*H04J 3/06* (2006.01)
*G01S 19/24* (2010.01)
*H04L 67/12* (2022.01)

(52) U.S. Cl.
CPC ............ *H04J 3/0638* (2013.01); *G01S 19/24* (2013.01); *H04L 67/12* (2013.01)

(58) Field of Classification Search
CPC ...... H04J 3/0638; G01S 19/24; G01S 19/256; H04L 67/12; H04Q 9/04; H04Q 2209/845
See application file for complete search history.

(56) References Cited

U.S. PATENT DOCUMENTS

| | | | | |
|---|---|---|---|---|
| 9,537,956 | B1* | 1/2017 | Sibenac | H04W 56/001 |
| 2011/0031940 | A1* | 2/2011 | Green | H02M 1/4208 |
| | | | | 323/205 |
| 2011/0095866 | A1* | 4/2011 | Karr | G06Q 10/00 |
| | | | | 340/10.1 |
| 2019/0326916 | A1* | 10/2019 | Parra Vilchis | H04L 67/1059 |
| 2020/0128140 | A1* | 4/2020 | Takahashi | H04N 23/60 |
| 2020/0241130 | A1* | 7/2020 | Lewandowski | H04L 12/40013 |
| 2021/0341627 | A1* | 11/2021 | Broumandan | G06F 17/18 |

OTHER PUBLICATIONS

Liu et al., "The Matter of Time—A General and Efficient System for Precise Sensor Synchronization in Robotic Computing," Cs.RO, Submitted on Mar. 30, 2021, arXiv:2103.16045v1, 4 pages.

* cited by examiner

*Primary Examiner* — Michael A Keller
*Assistant Examiner* — Thao D Duong
(74) *Attorney, Agent, or Firm* — Fish & Richardson P.C.

(57) ABSTRACT

This disclosure relates to signal synchronization of a multi-sensor system. In one aspect, a method includes identifying a trigger signal by a processor on a circuit, where the circuit is coupled to multiple groups of sensors. Each group has one or more sensors and each sensor has a respective sensor type. For each senor in each group of the multiple groups of sensors, a synchronized trigger signal is generated using the identified trigger signal based at least on the respective sensor types. The synchronized trigger signals, once received by corresponding sensors, cause the corresponding sensors to synchronously collect sensor data for a particular scene. The synchronized trigger signals is transmitted to corresponding sensors in the multiple groups of sensors for controlling execution of data collection.

19 Claims, 8 Drawing Sheets

SYNCHRONIZATION FOR MULTI-SENSOR SYSTEMS

CROSS-REFERENCE TO RELATED APPLICATION

This application is based upon and claims benefit of priority of the prior CN Patent Application No. 202310266388.9, filed on Mar. 13, 2023. The disclosure of the foregoing application is hereby incorporated by reference in its entirety.

TECHNICAL FIELD

This specification relates to synchronizing trigger signals for controlling the execution of a multi-sensor system.

BACKGROUND

Some multi-sensor systems can be a system including one or more sensors to collect sensor data for a particular scene. The collected sensor data can be analyzed for different applications, e.g., determining a change in an environment, detecting one or more objects in the scene, determining a distance from an object in the scene to the sensor, or other purposes. One example application using a multi-sensor system is autonomous driving. In autonomous driving, a circuit or a processor receives sensor data for a scene from multiple sensors and processes the sensor data, for example, to determine a trajectory for an autonomous vehicle to traverse. Ideally, the collected data should represent the scene at the same time or time steps. However, one or more sensor data can be asynchronous, e.g., due to control or transmission delays, causing the collected sensor data to represent the scene at two or more different times or time steps.

SUMMARY

In general, this specification describes techniques for synchronizing multiple sensors in a multi-sensor system. More specifically, the described techniques generate synchronized trigger signals for controlling the execution of the multiple sensors such that each sensor is triggered to collect sensor data at the same timestamp, with the same period or frequency, or both. Furthermore, the described techniques can further ensure that each of the collected sensor data is associated with a precise timestamp using a global navigation satellite system (GNSS) followed by an optional calibration process. To generate the synchronized trigger signals, the described techniques can customize a synchronized trigger for each sensor in one or more groups of sensors, take into consideration the characteristics of the sensor or the sensor group, compensating for the transmission delay or control delay for transmitting trigger signals, and harmonize the synchronized trigger signal with a particular sensing task by the system. Each generated synchronized trigger signal for a corresponding sensor can specify one or more of: a respective frame rate for a sensor to collect sensor data, a respective phase (e.g., of an impulsive signal) to trigger the collecting, a respective pulse width satisfying a respective duty cycle, or a respective polarity based on a particular application of the sensor.

One aspect of the subject matter described in this specification can be embodied in methods that include generating synchronized trigger signals for controlling the execution of multiple sensors in a multi-sensor system. The method includes identifying a trigger signal by a processor on a circuit, where the circuit is coupled to multiple groups of sensors. Each group has one or more sensors and each sensor has a respective sensor type. The method further includes generating, for each senor in each group of the multiple groups of sensors, a synchronized trigger signal using the identified trigger signal based at least on the respective sensor types. The synchronized trigger signals, once received by corresponding sensors, cause the corresponding sensors to synchronously collect sensor data for a particular scene. The synchronized trigger signals is transmitted to corresponding sensors in the multiple groups of sensors for controlling execution of data collection. Other implementations of this aspect include corresponding apparatus, systems, and computer programs, configured to perform the aspects of the methods, encoded on computer storage devices.

These and other implementations can each optionally include one or more of the following features. In some aspects, one group of the multiple groups of sensors can include a first sensor with a first sensor type and a second sensor with a second type. The synchronized trigger signal for the first sensor and the synchronized trigger signal for the second sensor can specify a respective frame rate, a respective phase, a respective pulse width, or a respective polarity for triggering sensor operations.

To identify the trigger signal by the processor, the system implementing the described techniques can select, as the identified trigger signal, a trigger signal received by the processor from a primary sensor in one group of the multiple groups of sensors. Alternatively or in addition, the system can generate, as the identified trigger signal, a trigger signal based on time data received by a global navigation satellite system (GNSS). The received trigger signal can include a Pulse Per Second (PPS) signal. Alternatively, the system can generate the trigger signal by the processor according to a local timer or counter in the circuit.

Before generating synchronized trigger signal, the method can further include calibrating the identified trigger signal with a local timer or counter in the circuit.

One of the synchronized trigger signals can have a different frame rate, phase, polarity, or pulse width from the identified trigger signal. The respective sensor types can include an image sensor, an audio sensor, or a laser sensor. In addition, one of the multiple groups of sensors can include four cameras and one LiDar.

In some cases, a first synchronized trigger signal for a first sensor in the multiple groups of sensors can have a different phase from a second synchronized trigger signal for a second sensor in the multiple groups of sensors. The phase difference can be determined by the processor based on an elapsed time period for transmitting the first and second synchronized triggers signals to the first and second sensors, respectively.

In some implementations, the system can calibrate the identified trigger signal across the multiple groups of sensors using a local timer or counter in the circuit or a timestamp specified by a global navigation satellite system (GNSS).

For cases where the identified trigger signal is a signal received from a primary sensor in a group of the multiple groups of sensors, the system can transmit the synchronized trigger signals to worker sensors in one or more groups of multiple groups of sensors.

In some cases, the circuit can include a multiplexer unit for transmitting one of the synchronized trigger signal to a corresponding worker sensor. The multiplexer unit is coupled to a first I2C primary-worker bus for a first synchronized trigger signal, and a second I2C primary-worker bus for a second synchronized trigger signal. The system can receive, at the multiplexer unit, a selection signal from a broadcast data bus, and select, based on the selection signal, one of the first synchronized trigger signal or the second synchronized trigger signal to transmit to the corresponding worker sensor.

To determine an elapsed time period for signal transmission, the system can determine the elapsed time period by calculating an offset value between a first time when the trigger signal including a Pulse Per Second (PPS) signal is received from a global navigation satellite system (GNSS) and a second time when the PPS signal has been transmitted to a corresponding component in the circuit using a sequence of telemetry packets.

The subject matter described in this specification can be implemented in particular embodiments so as to realize one or more of the following advantages.

The described techniques improve the accuracy of fusing sensor data captured from different sensors in a multi-sensor system, which further improves the accuracy of downstream applications of the fused sensor data (e.g., image generation and processing, component controls in robots or self-driving vehicles, or sensor system optimization). Sensor data for a scene collected by different sensors can be mismatched due to discrepancies in, e.g., timestamps, triggering, transmission delays, sampling frequencies or phases, or impulsive widths. Mismatched sensor data can cause undesirable noises or errors for fusing algorithms, which further contributes to inaccurate perception of a scene.

Accordingly, to generate an accurate holistic understanding of a scene, the described techniques ensure that each sensor in a multi-sensor system collects corresponding sensor data for a scene simultaneously or harmoniously for one or more time steps (e.g., sensor data are collected at the same time steps of all or at least a portion of all time steps), which reduces undesirable measurement noises leading to fusing errors. To achieve this goal, the described techniques set a reference time for generating trigger signals. The reference time can be a local timer or counter in a host circuit or time data from a GNSS (or a Global Position System (GPS)). In addition, the system compensates for different elapsed time periods (also referred to as delays) in transmitting trigger signals from the host circuit (or, equivalently, a processor in the host circuit) to corresponding sensors, such that the sensors are substantially triggered simultaneously to collect sensor data in a harmonized fashion.

In addition, the described techniques generate synchronized trigger signals that are compatible with different multi-sensor systems, which can have various sensor types and different numbers of sensors in one or more sensor groups. The synchronized trigger signal can account for different characteristics in the multi-sensor system. For example, the system characterizations can include different sensors, different routings or physical connections between sensors and a host circuit, across sensors in a sensor group, or across sensor groups, or different driver software in the sensors for processing the received trigger signals, or other system characteristics. Different sensors can have different characteristics as well. For example, sensor characteristics can include different working or sampling frame rates, permissible pulse widths (e.g., duty cycles), preferable signal polarities compatible across sensors, or other sensor characteristics. The synchronized trigger sensors are compatible with different systems and various task requirements by taking the above-noted characteristics into consideration.

Furthermore, the described techniques improve the efficiency of generating synchronized trigger signals and broadcasting these signals to corresponding sensors. For example, the described techniques do not require significant computation resources to generate synchronized trigger signals. Instead, the generation process involves minimal computations and time. For example, a processor can generate a synchronized trigger signal for a worker sensor based on operating characteristics of a primary sensor. As another example, the synchronized trigger signal can be generated based on a local timer or time data from a GNSS. The described techniques can broadcast the generated trigger signals to corresponding sensors using high-speed data buses, for example, one or more serial communication data buses or inter-integrated-circuit (I2C) primary-worker data buses. The broadcasting can be further assisted using one or more multiplexer (MUX) units, and a broadcast bus to switch trigger signals from different primary buses.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, this specification describes systems and techniques for generating synchronized trigger signals that, once received and executed by processors in corresponding sensors, cause the corresponding sensors to perform sensor operations harmoniously. For the purposes of this document, the term "harmoniously" generally refers to that sensors are triggered to collect sensor data at substantially the same time, and that the collecting process allows for data from a first sensor to be matched (not necessarily for each collecting cycle) with other sensors in one or more sensor groups. In addition, each of the collected sensor data (e.g., image data, a reflected light signal) is tagged with an accurate timestamp for fusing. The term "fusing" generally refers to aggregating sensor data from different sensors for analyzing a scene (or one or more components in the scene) at one or more time steps. To generate synchronized trigger signals, the described techniques account for system and sensor characteristics and use a reference timer (e.g., a local timer in a host circuit or external time data from a GNSS). In some implementations, the system calibrates local timers with external time data, or harmonizes received input triggers with local timers or the GNSS time data, or both. In addition, the described techniques can broadcast synchronized trigger signals using high-speed data buses such as I2C primary-slave buses. In some cases, a system implementing the described techniques can include one or more multiplexer units (MUXs) and a broadcast data bus for broadcasting synchronized trigger signals.

Figure 1:
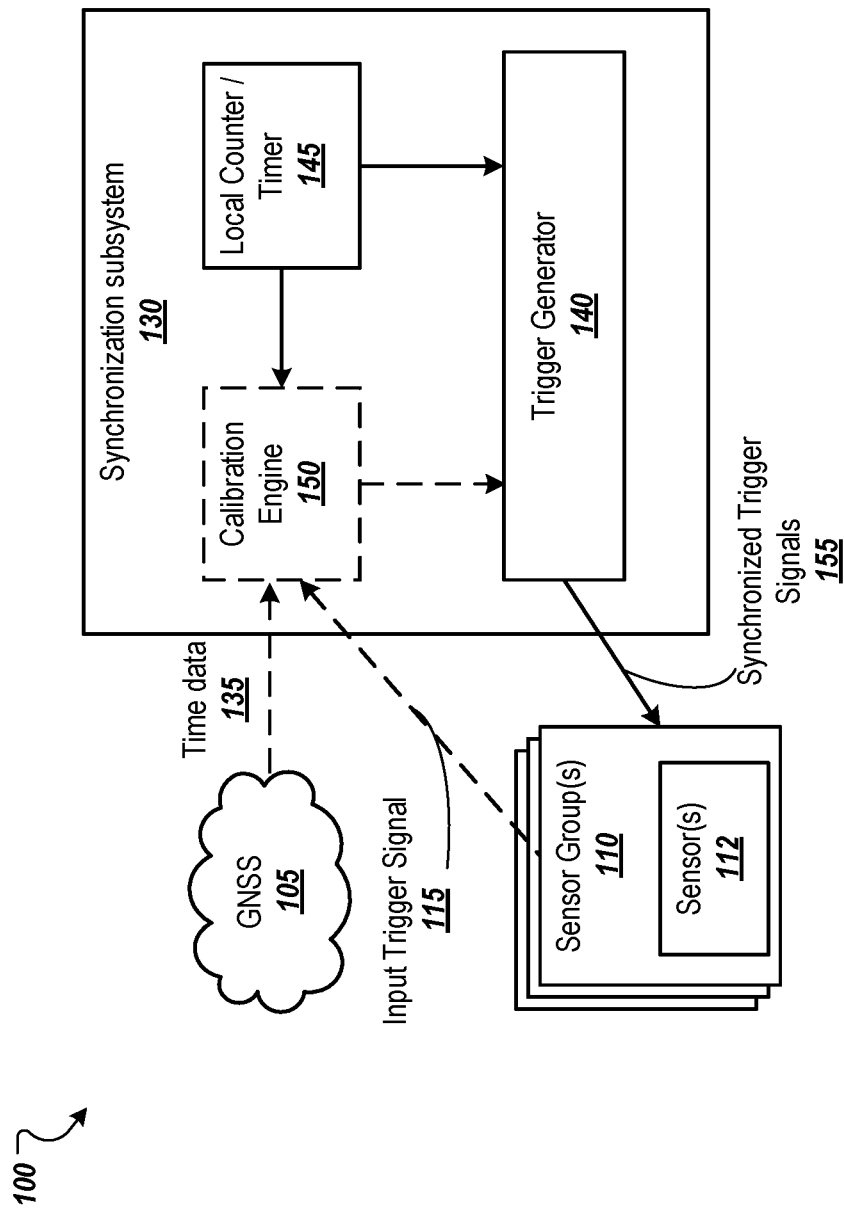
FIG. 1 is a block diagram of an example multi-sensor system.

FIG. 1 is a block diagram of an example multi-sensor system 100. The system 100, for example, can include multiple sensor groups 110 and a synchronization subsystem 130. The example system 100 is a system implemented on one or more computers in one or more locations, in which systems, components, and techniques described below can be implemented. Some of the components of the system 100 can be implemented as computer programs configured to run on one or more computers. The synchronization subsystem 130 can include any suitable engines or algorithms configured to generate synchronized trigger signals for controlling sensors in the multi-sensor system 100 according to various tasks and requirements.

The synchronization subsystem 130 is configured to generate synchronized trigger signals 155 for controlling sensor operations of multiple sensors. Each of the sensor groups 110 can include multiple sensors 112. Although the system 100 is referred to as a multi-sensor system, the system 100 can be external to the multiple sensors 112. The synchronization subsystem 130 on a host circuit can stand alone as a system for generating synchronized trigger signals, and the sensors in multiple sensor groups can be coupled to the host circuit through various IO ports.

The sensors of the multiple sensors 112 can be grouped into a particular sensor group of sensor groups 110 according to different sensing tasks and requirements. The types and number of sensors in a sensor group can be specified according to various tasks and requirements. For example, a first group of sensors can include four video sensors and a position sensor for collecting components in the vicinity of a robot. The robot, for example, can be an autonomous driving vehicle. The video sensors can include cameras, and the position sensor can include a light detecting and ranging sensor (LiDar). As another example, a second group of sensors can include a single camera for determining a farther view of an autonomous driving vehicle. As another example, a third group of sensors can include dynamics sensors configured to determine vehicle dynamics such as velocity, accelerations, and locations. Although the example groups of sensors listed above include cameras, LiDars, and dynamics sensors, different numbers of other types of sensors can be included into groups according to different tasks. For example, another group of sensors can include multiple front-view cameras and one or two LiDar sensors.

In addition, the number of sensor groups coupled to a circuit can be specified according to different tasks. In some implementations, an autonomous driving system includes multiple self-driving vehicles, each vehicle having an onboard circuit for controlling sensor operations for the vehicle. In this case, each circuit can be coupled to different numbers of group sensors and different types and numbers of sensors in each group. In some implementations, the above-noted different circuits can be communicatively-coupled for controlling corresponding sensors. For example, multiple circuits can be integrated into a cluster or a sub-system for controlling multiple sensor operations, which can simplify the system design and reduce the overall cost.

The synchronization subsystem 130 includes a trigger generator 140. The trigger generator 140 is configured to determine a respective sampling frequency, pulse width, signal phase of a trigger signal for each sensor such that these trigger signals are synchronized to trigger sensor operations in a harmonious fashion. To generate synchronized trigger signals 155, the trigger generator 140 can process one or more input trigger signals 115 received from corresponding sensors 112. In some implementations, the trigger generator 140 generates synchronized trigger signals using a local timer or counter 145 on the host device (e.g., host circuit). The local timer or counter 145 can also be used to determine timestamps associated with trigger signals. In general, a local timer of a host circuit issues local clock signals for timestamping a particular event or process, and a local counter for the host circuit is a device configured to count and store the number of times the particular event or process has occurred. Although a counter can mainly be for counting specific events happening in the host circuit, the counted number by a counter can be related to a clock signal, so a counter can be used in the described techniques as a timer. A local timer or counter is also referred to as an internal timer or counter in this document.

In some cases, the trigger generator 140 can generate synchronized trigger signals using time data 135 from a GNSS 105. The time data 135, for example, can include Pulse Per Second (PPS signal), which is accurate for generating frame-level synchronized trigger signals. In addition, PPS signals have little or no accumulated errors such that the time and frequency accuracy can be maintained for a quite long time period. The frequency of receiving time data 135 at the synchronization subsystem 130 can be used as a base frequency for generating synchronized trigger signals. The time data 135 can be also used as a reference time for timestamps.

As shown in FIG. 1, the synchronization subsystem 130 can include a calibration engine 150 configured to calibrate data. In some cases, the calibration process can be performed before the trigger generator 140 generates synchronized trigger signals. The calibration engine compares the time discrepancy between the received time data 135 from GNSS 105, the clock signals issued from the local counter or timer 145, and the received input trigger signal 115 from sensor(s) 112. The calibration engine 150, for example, can reduce the accumulated errors or discrepancies between the received time data 135 and the time value indicated by a local timer or counter 145. Given the time data 135 issued by a GNSS 105 being long term accurate, the subsystem 130 would adjust the local timer or counter 145 to match with the time data 135. For example, assuming a GNSS signal period is received at every 3.3 ms, and the subsystem 130 would check if the local timer 145 measures a period of 3.3 ms. If not, the subsystem 130 would update the local time 145 to match with the GNSS signal. In some implementations, the subsystem 130 can factor the discrepancies into a phase change to generate synchronized trigger signals.

As another example, the calibration engine 150 can determine the timestamp accuracy for a received input trigger signal 115. The synchronization subsystem 130 can compare the timestamp specified by time data 135 issued from the GNSS 105 or the timestamp issued by the local counter or timer 145 with the timestamp associated with the input trigger signal 115. If the two do not match, the subsystem 130 can update the timestamp associated with input trigger signal 115. In some cases, the subsystem 130 can factor the timestamp discrepancies into a phase change when using the received input trigger signal 115 to generate synchronized trigger signals.

In some implementations, the calibration process can be performed after the trigger generator 140 generates the synchronized trigger signals. For example, the calibration engine 150 can determine time errors or discrepancies between the generated synchronized trigger signals with time data 135 received from the GNSS 105 or the clock signals issued by the local counter or timer 145. The subsystem 130 can update the synchronized trigger signals with the corrected times or timestamps once detecting the time errors or discrepancies. In some cases, the calibration engine 150 can factor the time or timestamp discrepancies into a phase change for updating the existing synchronized trigger signals based on the phase change.

Figure 2:
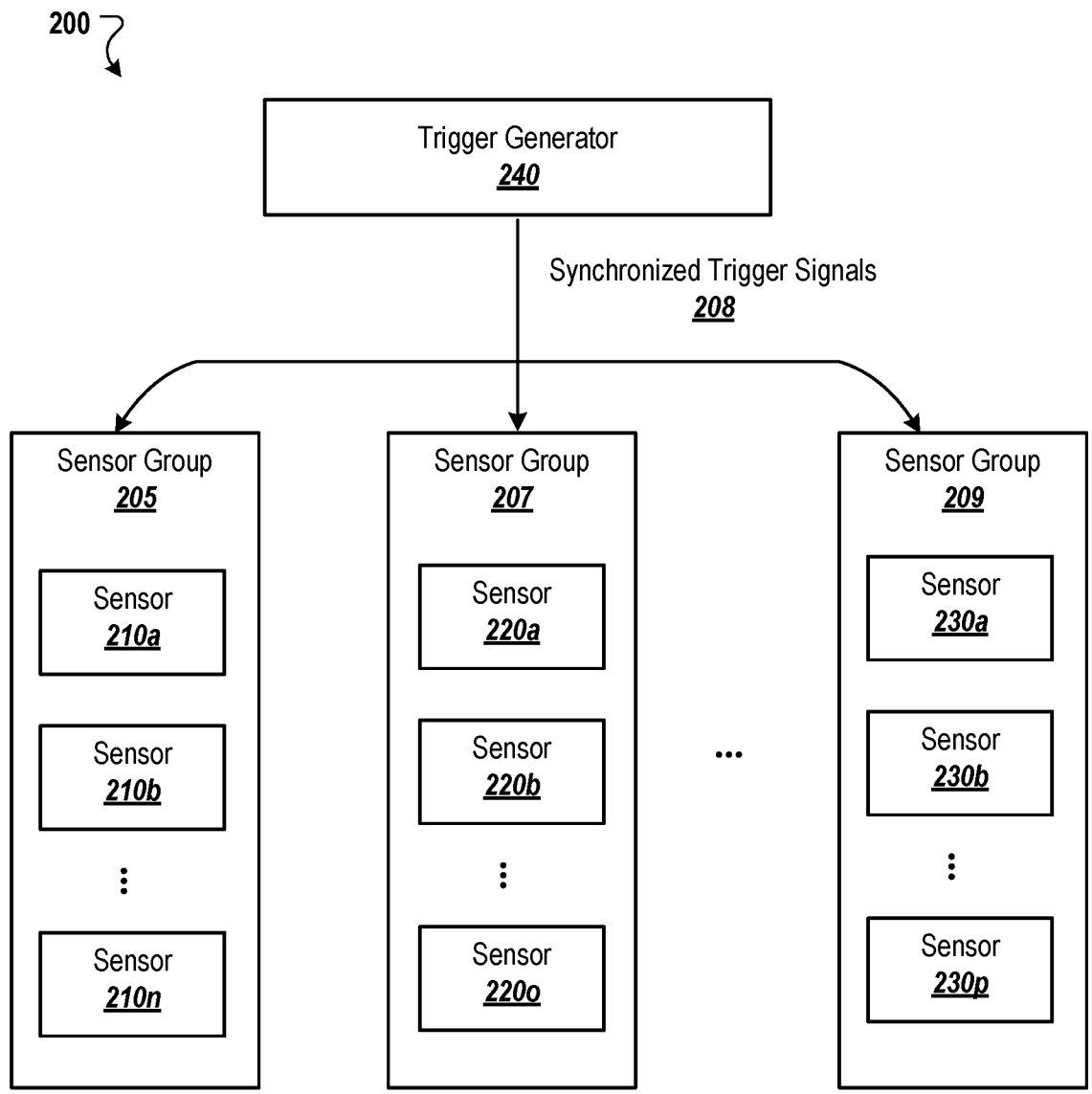
FIG. 2 illustrates an example structure of sensor groups having respective sensors in a multi-sensor system.

FIG. 2 illustrates an example structure 200 of sensor groups 205, 207, and 209 having respective sensors 210a-n, 220a-o and 230a-p in a multi-sensor system. The multi-sensor system can be similar to the multi-sensor system 100 of FIG. 1.

As shown in FIG. 2, the multiple sensor groups 205, 207, and 209 are communicatively coupled to a trigger generator 240 (which can be similar to the trigger generator 140 described above with respect to FIG. 1). The trigger generator 240 can transmit synchronized trigger signals 208 to one or more sensors in corresponding sensor groups. In some cases, one or more sensors can provide input trigger signals to the trigger generator 240 as input for generating the synchronized trigger signals 208, which are described in greater detail in connection with FIG. 3.

Each host circuit (and the trigger generator 240 included in the circuit) can be coupled to multiple sensor groups 205, 207, and 209. Although FIG. 2 illustrates three sensor groups coupled to the trigger generator 240, it should be appreciated that the trigger generator 240 can be coupled to any suitable number of sensor groups, for example, one, two, five, ten, or other suitable numbers.

Similarly, each sensor group can include a respective number of sensors and respective sensor types and each group need not have an equal number of sensors. As shown in FIG. 2, sensor group 205 can include sensors 210a-n, sensor group 207 can include sensor group 220a-o, and sensor group 209 can include sensor groups 230a-p. As a naïve example, sensors 210a-n can include three sensors, all of which are dynamics sensors, sensors 220a-o can include five sensors, all of which are LiDars, and sensors 230a-p can include seven sensors, including two dynamics sensors, one LiDar, and four cameras. The number of sensors represented by n, o, and p can be different numbers or the same number. It is appreciated that the above-noted numbers and types for sensors are for ease of illustration. Other suitable numbers and types for sensors in a sensor group can be set according to different sensing requirements and tasks.

In some cases, one or more sensors in one or more sensor groups can be specified by the system or a user as primary sensors, and the rest of the sensors in the multi-sensor system can be specified as worker sensors. The term "primary sensor" generally refers to a sensor triggered by a particular trigger signal. The particular trigger signal can specify trigger data including at least one or more of a sampling frame rate, a pulse width, a sampling phase, or a preferable polarity. The particular trigger signal can be processed by a system (e.g., the synchronization subsystem 130, the trigger generator 140 of FIG. 1, or the trigger generator 240 of FIG. 2) to generate synchronized trigger signals (e.g., synchronized trigger signals 155 of FIG. 1 or 208 of FIG. 2). The term "worker sensor" generally refers to a sensor triggered by a synchronized trigger signal, which is generated based on the particular trigger signal for the primary sensor. One example primary sensor can be a LiDar with a sampling frequency of 10 Hertz or 10 frames per second, and corresponding worker sensors can include multiple cameras with 20 Hertz or 20 frames per second. Another example can be a LiDar with a sampling frequency of 10 Hertz or 10 frames per second and multiple cameras with a sampling frequency rate of 30 Hertz or 30 frames per second. The details of primary sensors and worker sensors and how they are related to synchronized trigger signals are described in connection with FIGS. 3-5.

Figure 3:
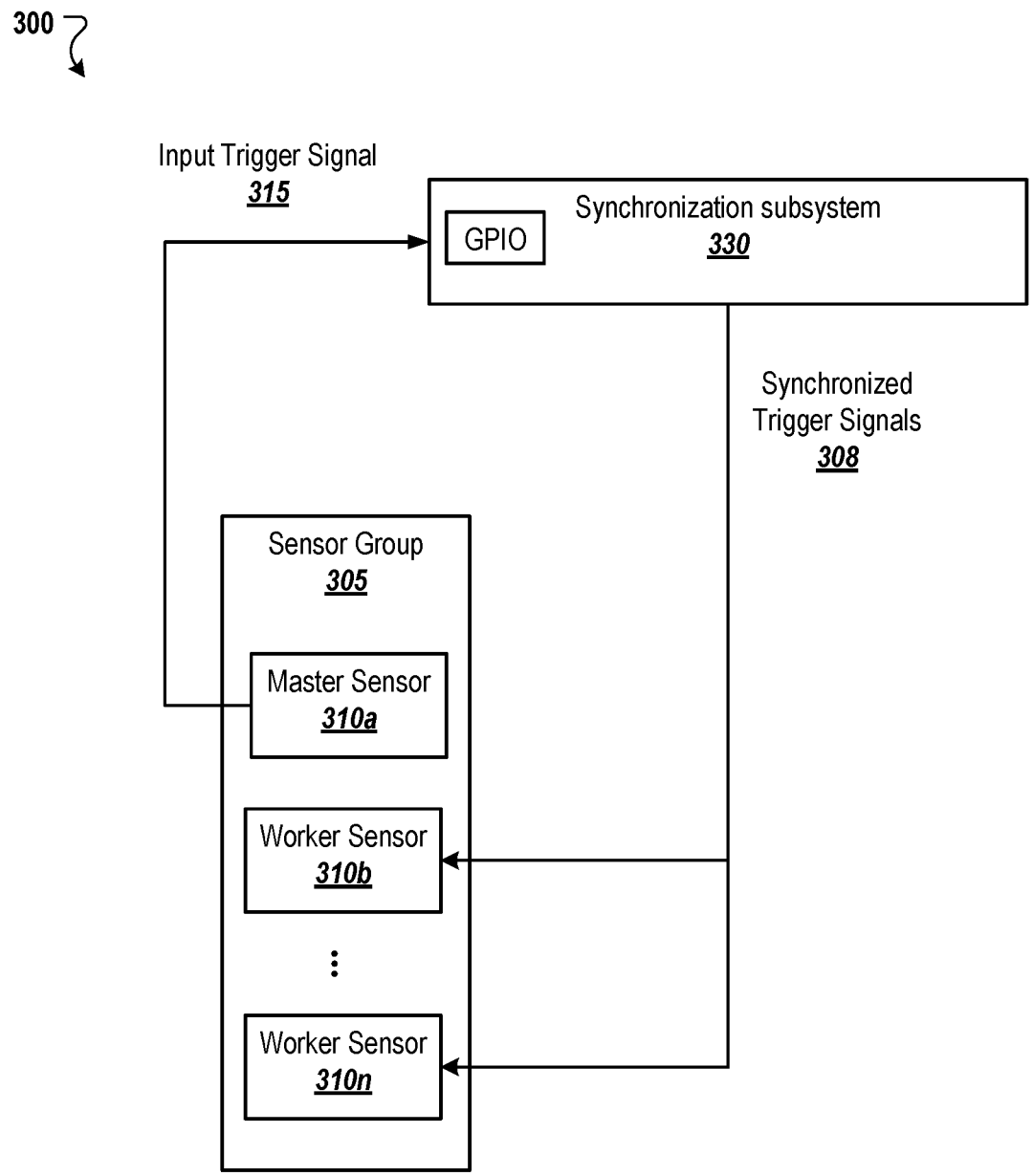
FIG. 3 is a block diagram that illustrates an example process of signal transmission between a sensor group and a synchronization subsystem.

FIG. 3 is a block diagram that illustrates an example process 300 of signal transmission between a sensor group 305 and a synchronization subsystem 330. The sensor group 305 can be similar to the sensor group 110 of FIG. 1 or the sensor group 205, 207, or 209 of FIG. 2. The synchronization subsystem 330 can be similar to synchronization subsystem 130 of FIG. 1.

As shown in FIG. 3, the sensor group 305 can include multiple sensors 310a-n. Each sensor 310a-n can be of a particular sensor type including a camera, a LiDar, a dynamics sensor, a thermal sensor, or other suitable sensor. For the purpose of generating synchronized trigger signals for controlling sensor operations of sensors 310a-n, the system or a user can specify one of the sensors 310a-n in the sensor group 305 to be a primary sensor 310a, and specify the rest of the sensors 310b-n in the sensor group 305 to be worker sensors. For example, the primary sensor 310a can be a LiDar, and the worker sensors can include multiple cameras.

The sensor group 305 or the primary sensor 310a can provide the particular trigger signal for controlling primary sensor 310a operations as an input trigger signal 315 to the synchronization subsystem 330. The input trigger signal 315 can be provided to the synchronization subsystem 330 through any suitable data communication techniques, wirelessly or through physical wires. One example data transmission includes using a general purpose input and output (GPIO) port integrated into a host circuit (or the synchronization subsystem 330). The synchronization subsystem 330 (or the trigger generator 140 of FIG. 1) can generate the synchronized trigger signals 308 based on the input trigger signal 315. For example, the trigger generator 340 can directly select the input trigger signal 315 as the synchronized trigger signals 308 for worker sensors 310b-n.

As another example, the trigger generator (not shown, but similar to the trigger generator 140 of FIG. 1) can generate the synchronized trigger signals 308 by modifying the phase of the input trigger signal 315 so that worker sensors 310b-n are triggered to collect and/or send sensor data substantially simultaneously with the primary sensor 310a. The phase modification can be determined based on the delays in transmitting or processing control signals. For example when the primary sensor 310a is a LiDar with a sampling frequency of 10 Hertz, and the worker sensors include multiple cameras with a sampling frequency of 20 Hertz. The synchronized trigger signals 308 can specify a sampling frequency of 10 Hertz for the camera worker sensors. In some cases, due to various delays according to different routings or structures, and, optionally, the processing time needed for sensor drivers, the synchronized trigger signals 308 can have slightly different phases for different worker sensors. In some situations where the worker sensors have different duty cycle sizes (e.g., a ratio of an active width of a pulse to a period of the pulse, or a ratio of an active width to an inactive width for a signal cycle), the synchronized trigger signals 308 can have respective pulse widths. In addition, even for the same types of worker sensors, the synchronized trigger signals 308 can have different pulse polarities due to various task requirements. More example synchronized trigger signals are described in greater detail in connection with FIGS. 6-7.

In some cases, the synchronization subsystem 130 is configured to calibrate the received input trigger signal 115 with reference timestamps. The reference timestamps can be determined using time data from a GNSS system or by a timer or counter locally included in a host circuit. This way, the system can determine the exact time for triggering worker sensors, and thus determine a phase adjustment (if needed) to generate synchronized trigger signals from the input trigger signal 115.

Figure 4:
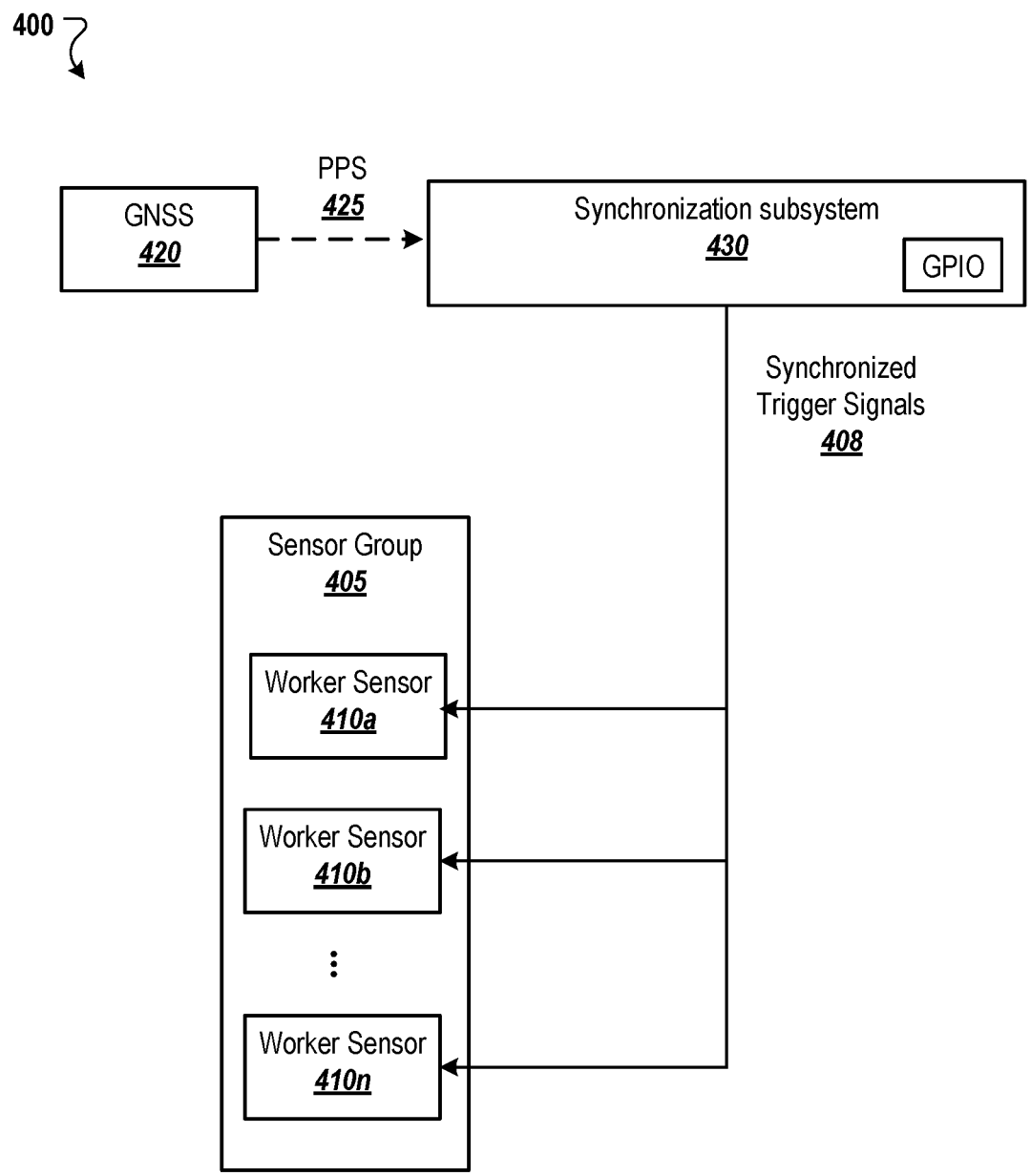
FIG. 4 is a block diagram that illustrates another example process of signal transmission between a sensor group and a synchronization subsystem.

FIG. 4 is a block diagram that illustrates another example process 400 of signal transmission between a sensor group 405 and a synchronization subsystem 430. The sensor group 405 can be similar to the sensor group 110 of FIG. 1 or the sensor group 205, 207, or 209 of FIG. 2. The synchronization subsystem 430 can be similar to the synchronization subsystem 130 of FIG. 1.

Unlike the example process 300 shown in FIG. 3, the sensor group 405 in FIG. 4 does not include a primary sensor (or equivalently, the multi-sensor system 100 or a user does not specify a primary sensor from sensors in the sensor group 405). Instead, the sensors in the sensor group 405 are all worker sensors 410a-n.

To determine synchronized trigger signals 408 for controlling sensor operations of the worker sensors 410a-n, the synchronization subsystem 430 can receive Pulse Per Second (PPS) signals 425 from a global navigation satellite system (GNSS) 420. The GNSS 420 can be similar to the GNSS 105 of FIG. 1.

The synchronization subsystem 430 can receive the PPS signals 425 through the GPIO port(s). In some cases, the synchronization subsystem 430 is configured to calibrate the received PPS signals 425 with reference timestamps. The reference timestamps can be determined based on a timer or counter locally included in a host circuit. This way, the system can determine the exact time for triggering worker sensors, and thus determine a phase adjustment (if needed) to generate synchronized trigger signals from the input trigger signal 115.

To determine the exact timestamp for an event (e.g., receiving and transmitting the PPS signal), the subsystem 130 can further determine an elapsed time period for transmitting the PPS signals. The PPS signals can be received at the host circuit and transmitted to the subsystem using a sequence of telemetry packets. To determine the elapsed time period, the subsystem 130 can, for example, determine a first time at the rising edge of a received PPS signal. The subsystem can further determine a period for transmitting the received PPS signal by firing a sequence of packets. For example, assuming the time needed for firing each data packet is around 2 µs, the total number of firings for each PPS signal is 16, and the recharged period following the last firing is around 18 µs, the total elapsed time period to fire and recharge all 16 data packets is 50 µs, which equals (16×2+18) µs.

By determining the elapsed time period, the subsystem 130 can determine an exact timestamp representing the time point when to trigger worker sensors 410a-n in the sensor group 405. One example algorithm is described below. Let the number of points in a firing sequence be DI (data point index) ranging from 0-15, and the number of firing sequences be SI (sequence index) ranging from 0-23. The total time offset $T_O$=(elapsed time period×SI+firing time× DI) µs. Let the time stamp for a telemetry packet be $T_v$ (timestamp value), the exact time point for each PPS signal is determined as $T_e = T_v + T_O$.

The synchronized trigger signals 408 are generated based on the received PPS signals. Therefore, the synchronized trigger signals 408 and the received PPS signals can share a common sampling frequency. However, in some cases, the synchronized trigger signals can specify different frequencies to different worker sensors 410a-n in the sensor group 405. The synchronized trigger signals 408 might have different phases from the PPS signals due to the above-described elapsed time period in receiving and transmitting the PPS signals on a host circuit.

In some cases, the synchronization subsystem 430 generates the synchronized trigger signals 408 based on a local timer instead of the PPS signals. In some cases, the synchronized trigger signals 408 can have the same sampling rate as the local timer or counter. Alternatively, the synchronized trigger signals 408 can have a slower sampling rate than the local counters, e.g., sampling data every other four counts. Similarly, the synchronized trigger signals 408 can have respective phases, pulse widths, and polarities due to respective sensors and sensing tasks.

Once the synchronized trigger signals 408 are generated, the synchronization subsystem 430 can transmit the synchronized trigger signals 408 to respective worker sensors 410a-n in the sensor group using suitable data communication techniques. For example, the signals can be communicated using physical connection such as GPIO ports, as described above.

Figure 5:
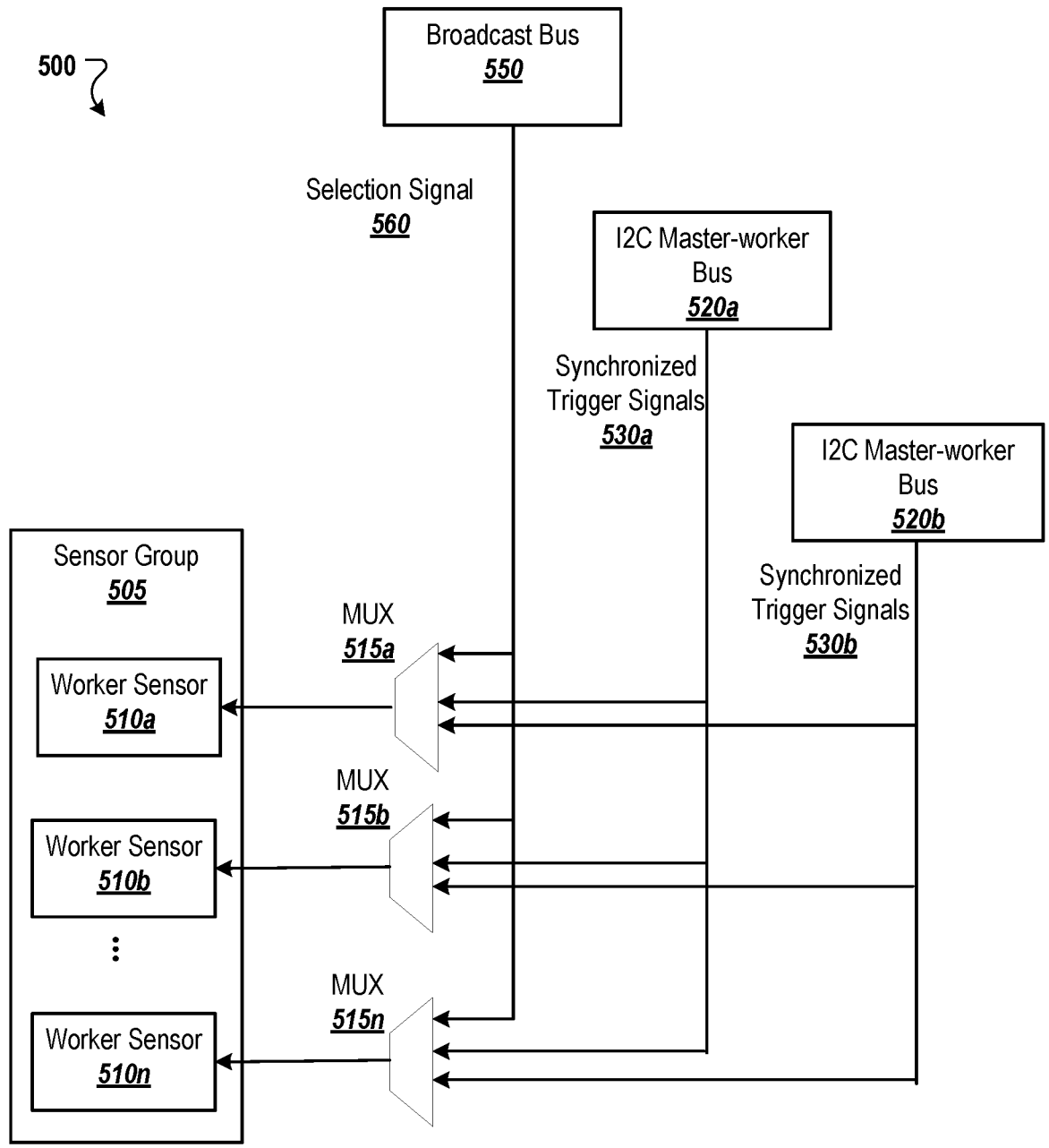
FIG. 5 is a block diagram that illustrates a portion of an example implementation of a multi-sensor system.

FIG. 5 is a block diagram that illustrates a portion of an example implementation 500 of a multi-sensor system. The portion of the example implementation 500 of a multi-sensor system is configured for broadcasting synchronized trigger signals. The sensor group 505 can be similar to the sensor group(s) 110 of FIG. 1, and the worker sensors 510a-n can be similar to the sensors 112 of FIG. 1. The portion of the example implementation 500 is based on a particular implementation where synchronized trigger signals are determined using input trigger signals from one or more primary sensors. As described above, a sensor group can include zero, one or more primary sensors, and one or more worker sensors. Each primary sensor can provide an input trigger signal to a synchronization subsystem, e.g., synchronization subsystem 130, for generating synchronized trigger signals. The synchronized trigger signals can be used to control operations of worker sensors in the same sensor group of the primary sensor, or in other sensor groups, or both. Accordingly, one worker sensor can be assigned to one or more primary sensors.

In general, synchronized trigger signals generated from different primary sensors can be transmitted to corresponding worker sensors using respective data buses. For example and as shown in FIG. 5, the portion of the example implementation 500 of a multi-sensor system can include different I2C primary-worker data buses to transmit synchronized trigger signals. More specifically, the system can transmit synchronized trigger signals 530a to corresponding worker sensors 510a-n using a first I2C primary-worker data bus 520a, and transmit synchronized trigger signals 530b to corresponding worker sensors 510a-n using a second I2C primary-worker data bus 520b.

Given one worker sensor might be "indirectly" controlled by multiple primary sensors, the multi-sensor system (e.g., system 100 of FIG. 1) needs to determine which one of multiple synchronized trigger signals should be received by the worker sensor. To determine this, the system includes multiple multiplexer (MUX) units 515*a-n* each assigned to a corresponding worker sensor 510*a-n*, respectively. Each MUX unit is also coupled to a respective I2C primary-worker bus 520*a* or 520*b*. The multi-sensor system or a user can instruct the MUX unit to select one of multiple I2C primary-worker buses to allow corresponding worker sensors to receive synchronized trigger signals transmitted along the selected bus. In some implementations, the system can further include a broadcast bus 550 to facilitate the broadcasting process. The broadcast bus is coupled to each of the MUX units 515*a-n*. The system or a user can specify one I2C primary worker bus using a selection signal 560. Once the MUX units receive the selection signal 560 along the broadcast bus 550, the MUX units select the I2C primary-worker bus specified in the selection signal 560 and allow corresponding worker sensors 510*a-n* to receive synchronized trigger signals transmitted along the selected bus.

Figure 6:
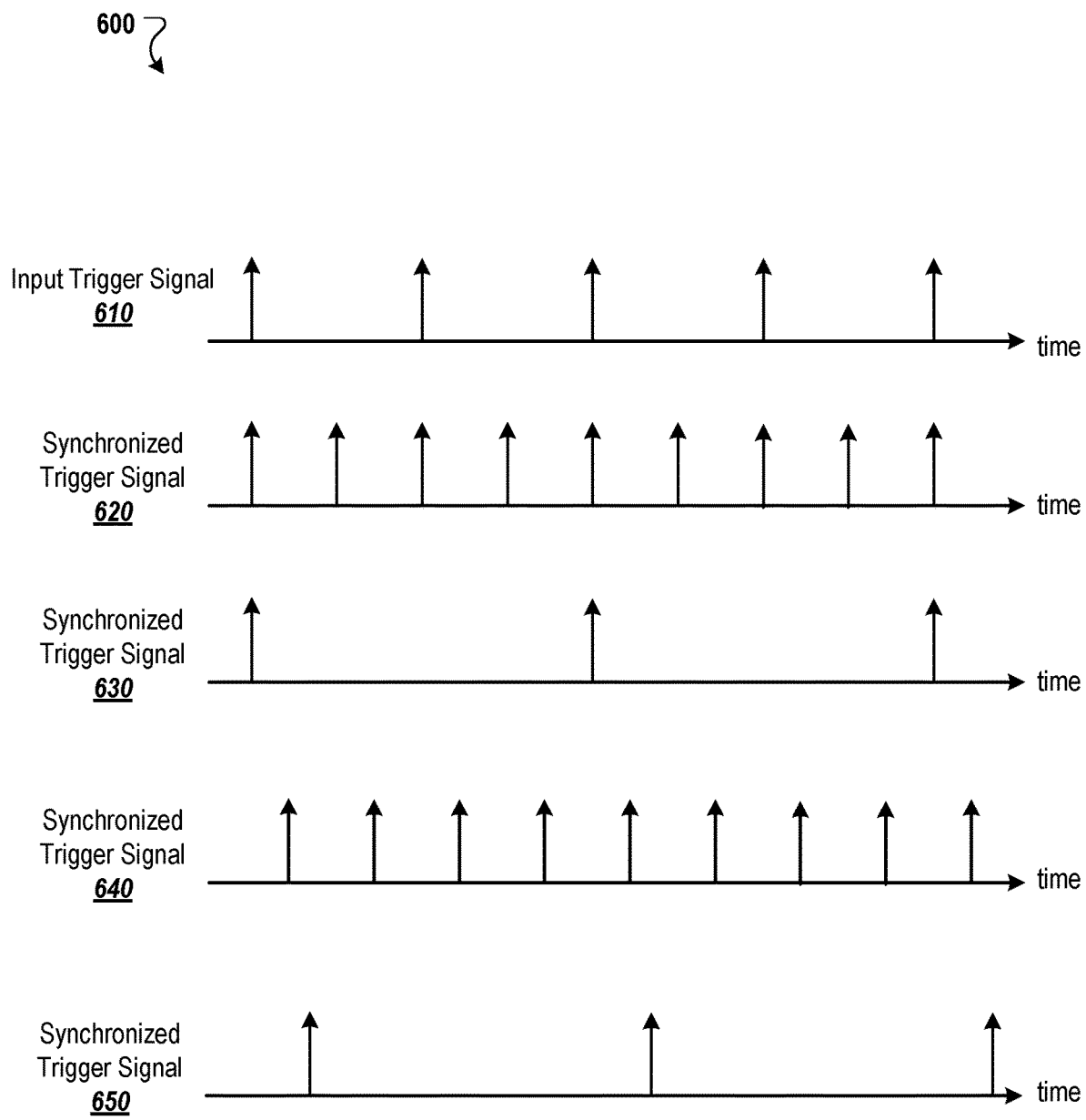
FIG. 6 illustrates examples of trigger signals and synchronized trigger signals.
Figure 7:
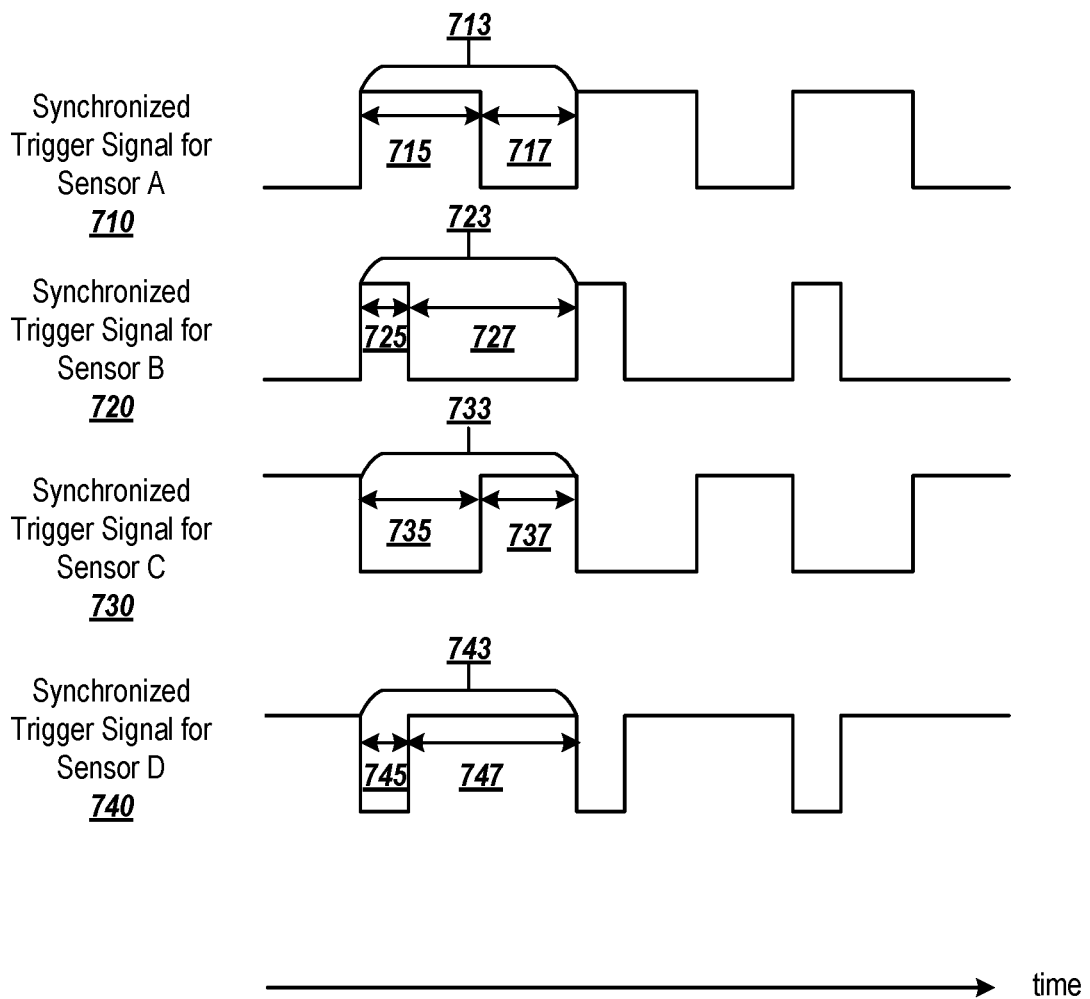
FIG. 7 illustrates additional examples of trigger signals and synchronized trigger signals.

FIG. 6 and FIG. 7 illustrate examples 600 and 700, respectively, of trigger signals and synchronized trigger signals.

Referring to FIG. 6, a trigger generator (e.g., trigger generator 140 of FIG. 1) in the multi-sensor system (e.g., system 100) can be configured to adjust sampling frame rates, or sampling phases, or both based on an input trigger signal 610. For example, the trigger generator can determine a synchronized trigger signal 620 having a faster sampling frame rate than the input trigger signal 610. Alternatively, the trigger generator can determine a synchronized trigger signal 630 having a slower sampling frame rate than the input trigger signal 610. These two cases can be applied to situations where the primary sensor has a different sampling rate than assigned worker sensors. As a naïve example, the primary sensor can be a LiDar with a sampling frame rate of 20 Hertz and multiple cameras with a sampling frame rate of 10 Hertz (Hz) by default. In this case, the trigger generator can boost the camera's sampling frame rate from 10 Hz to 20 Hz such that the LiDar and cameras can work at the same sampling frame rate. As another example, the primary sensor can be a first dynamics sensor with a maximum sampling frame rate of 30 Hz, and worker sensors can include multiple dynamics sensors with a sample frame rate of 50 Hz. Since the sampling frame rate for the first dynamics sensor cannot be increased, the trigger generator can lower down the sampling rate for worker sensors to 30 Hz. This way, both the primary dynamics sensor and the worker dynamics sensors can work at the same sampling frame rate.

In addition, as shown in FIG. 6, the trigger generator can generate a synchronized trigger signal 640 with a different phase and a greater sampling rate than the input trigger signal 610. Alternatively, the trigger generator can generate a synchronized trigger signal 650 with a different phase and a smaller sampling rate than the input trigger signal 610. The sampling rate differences are similar to those described above. The phase differences between the synchronized trigger signals 640, 650 and with the input trigger signal 610 are used to compensate for the elapsed time period in signal transmission between a host circuit to corresponding worker sensors, as described above. In some cases, the phase differences can also be attributed to a discrepancy between respective times determined in an optional calibration process.

Referring to FIG. 7, a trigger generator (e.g., trigger generator 140 in FIG. 1) can further generate synchronized trigger signals with different pulse widths and polarities for different worker sensors.

The trigger generator can generate a first synchronized trigger signal 710 for a first worker sensor A and a second synchronized trigger signal 720 for a second worker sensor B. Note both first and second synchronized trigger signals 710 and 720 have the same sampling frame rate and phase. More specifically, both signals 710 and 720 can have the same period 713 and 723. However, the first synchronized trigger signal 710 has a longer or greater pulse width 715 than the pulse width 725 of the second synchronized trigger signal 720. The corresponding inactive width 717 of the first synchronized trigger signal 710, i.e., the width between pulses, is shorter than the inactive width 727 of the second synchronized trigger signal 720. The pulse width differences are determined according to respective types of sensors, since different sensors can have respective preferable duty cycles. As described above, the term "duty cycle" in this document generally refers to a ratio of active time to a total signal cycle (or a pulse period), e.g., a ratio of pulse width 715 to period 713. A duty cycle can include a value of 1, 0.5, 0.25, or other suitable values. For a duty cycle of 0.5, the active time and inactive time each occupy 50 percent of a pulse period, respectively. For a duty cycle of 0.25, the active time occupies 25 percent of the pulse period, and the inactive time occupies 75 percent.

In addition, the trigger generator 140 can further generate a third synchronized trigger signal 730 for a third worker sensor C and a fourth synchronized trigger signal 740 for a fourth worker sensor D. Similarly, the third and fourth synchronized trigger signals share the same sampling frame rate and phase (e.g., the periods 733 and 743 have the same size, and the pulses jump up at the same time). The third synchronized trigger signal 730 has a greater duty cycle than the fourth synchronized trigger signal 740. However, the polarity of the third synchronized trigger signal 730 is opposite to that of the first synchronized trigger signal 710, and the polarity of the fourth synchronized trigger signal 740 is opposite to that of the second synchronized trigger signal 720. The polarities for worker sensors are determined according to respective task requirements. For example, a sensor can be configured to activate upon receiving a wave crest of a signal (also referred to as a positive polarity or an activation at high). As another example, a sensor can be configured to activate upon receiving a wave trough of a signal (also referred to as a negative polarity or an activation at low).

Figure 8:
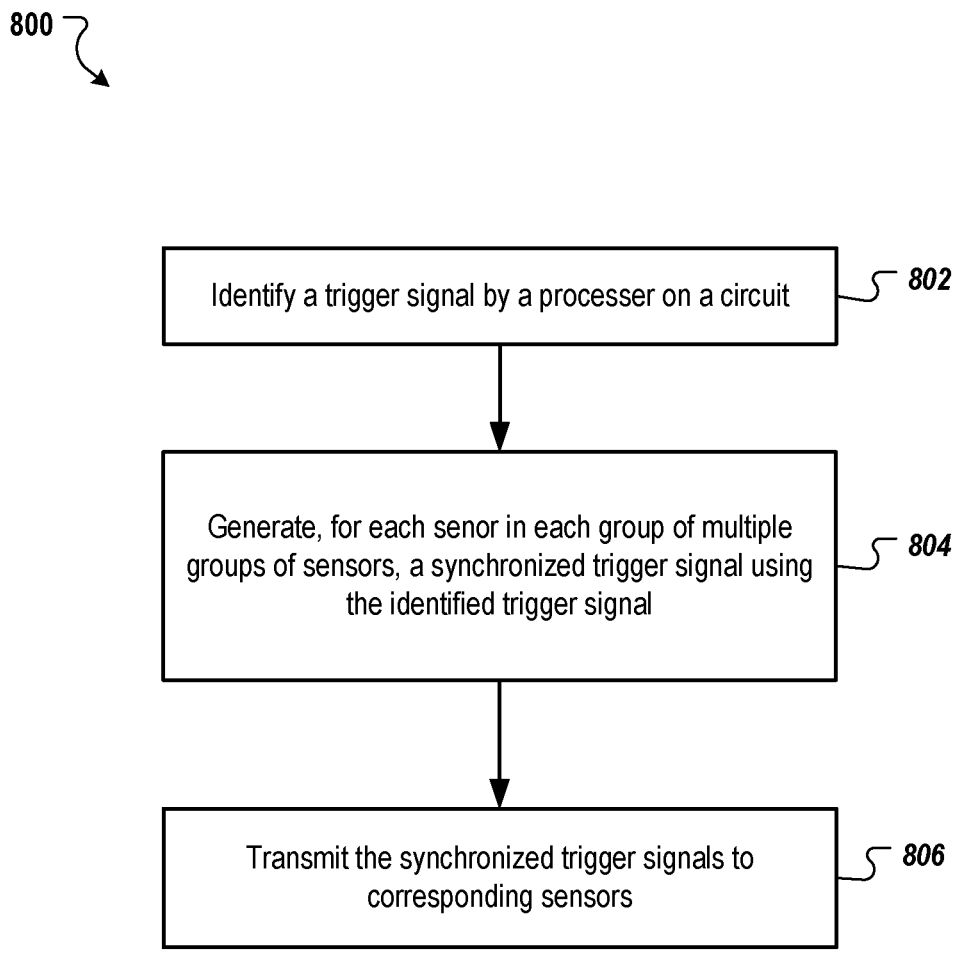
FIG. 8 is a flow diagram that illustrates an example process for synchronizing trigger signals for controlling sensor execution in a multi-sensor system.

FIG. 8 is a flow diagram that illustrates an example process 800 for synchronizing trigger signals for controlling sensor execution in a multi-sensor system. Operations of the process 800 can be implemented, for example, by the multi-sensor system 100 of FIG. 1, or more specifically, the synchronization subsystem 130 of FIG. 1. Operations of the process 800 can also be implemented as instructions stored on one or more computer readable media which may be non-transitory, and execution of the instructions by one or more data processing apparatus can cause the one or more data processing apparatus to perform the operations of the process 800.

The system is configured to generate synchronized trigger signals for controlling sensor operations of multiple sensors in a multi-sensor system. The multi-sensor system can include multiple sensor groups, each of the multiple sensor groups including multiple sensors of different types. The multiple sensors are coupled to a host circuit configured to issue synchronized trigger signals to control these multiple sensors. Although the system is named as a multi-sensor system, in some implementations, the system can include one or more host circuits only. The multiple sensors can be external to the host circuits and coupled to the host circuits using physical ports or wireless communications.

The system identifies a trigger signal by a processor on a circuit (802). As described above, the circuit is coupled to multiple sensor groups, and each sensor group includes multiple sensors of respective sensor types. Example sensor types can include an image sensor, an audio sensor, or a laser sensor. A first group of multiple sensor groups can include a first sensor with a first sensor type and a second sensor with a second sensor type. The first sensor can be, for example, a LiDar, and the second sensor can be, as another example, a camera. A first group of multiple sensor groups can also include one or more cameras, or one or more LiDars, or both. In some implementations, the system can include multiple circuits, each circuit being coupled to multiple sensor groups having various numbers and types of sensors.

By identifying a trigger signal, the system can select one or more input trigger signals from one or more primary sensors, and select one input trigger signal as the identified trigger signal. The primary sensors can be specified by the system or a user. The input trigger signal is generally suitable for controlling the sensor operations of a corresponding primary sensor. The input trigger signal can specify one or more of a frame rate (also referred to as sampling frame rate or sampling frequency in this document), a phase, a pulse width, or a polarity for instructing or controlling a corresponding primary sensor to collect sensor data.

Alternatively, the system can generate a trigger signal as the identified trigger signal based on time data received from a global navigation satellite system (GNSS). More specially, the GNSS can specify a reference time for timestamping events and the time data can include Pulse Per Second (PPS) signals received by a host circuit in a periodic fashion. The system can generate a trigger signal based on the PPS signals, and the trigger signal can be used to generate synchronized trigger signals for controlling sensors in the system.

In some cases, the identified trigger signal can be generated by time values or timestamps issued by a timer or counter local to the host circuit. The details of the local timer or counter are described above in connection with FIG. 1. The identified trigger signal can also be used to generate synchronized trigger signals for controlling sensor operations in the system.

The system generates a synchronized trigger signal for each sensor in each group of the multiple sensor groups (804). More specifically, the system generates synchronized trigger signals using the identified trigger signal based at least on the respective sensor types. The synchronized trigger signals can, once received by corresponding sensors and executed by drivers in the sensors, cause the corresponding sensors to synchronously collect sensor data for a particular scene. In general, the synchronized trigger signals can specify respective frame rates, phases, pulse widths, or polarities for corresponding sensors according to system characteristics and sensor characteristics. For example, the synchronized trigger signals can be determined by the system after the system determines and compensates for phase differences due to delays in signal transmission. As another example, the synchronized trigger signals can be determined by the system after the system considers pulse widths and polarities based on different characteristics of the sensors. More examples of sensor characteristics and system characteristics are described above.

Because the system considers respective sensor characteristics when generating synchronized trigger signals, one or more of the synchronized trigger signals can have a different frame rate, phase, polarity, or pulse width from the identified trigger signal. For example, the synchronized trigger signals can have a greater or smaller sampling frame rate, or different phases from that of the identified trigger signal. In some cases, the synchronized trigger signals can have different pulse widths and polarities from the identified trigger signal, or between one another.

Before generating synchronized trigger signals, the system can perform a calibration process. For example, the system can calibrate a timestamp using time values or data from a GNSS, or a local timer or counter. As another example, the system can calibrate the identified trigger signal using a local (or internal) timer or counter or using a timestamp specified by a GNSS. In some implementations, the system can further calibrate a timestamp for the local timer or counter using the time data received by a GNSS. More details of the calibration process are described above in connection with FIG. 1.

The system transmits the synchronized trigger signals to corresponding sensors (806). The multiple groups of sensors are triggered to collect sensor data for a scene after corresponding drivers on the sensors receive and process the synchronized trigger signals. The corresponding sensors include worker sensors assigned to one or more primary sensors.

To broadcast the synchronized trigger signals, the system can include a multiplexer unit for each worker sensor. The multiplexer units facilitate the broadcast process as it can be configured to select synchronized trigger signals transmitted along a selected data bus among multiple data buses. For example, a multiplexer can be coupled to a first I2C primary-worker data bus for a first synchronized trigger signal, and a second I2C primary-worker bus for a second synchronized trigger signal. The multiplexer unit is also coupled to a broadcast data bus for facilitating the broadcast process. More specifically, the multiplexer unit is configured to receive a selection signal along the broadcast data bus, and select, based on the selection signal, one of the first synchronized trigger signals or the second synchronized trigger signal to transmit to the corresponding worker sensor. The election signal can be specified by the system or by a user.

To generate accurate timestamp or correct phase changes in the trigger signals, the system can determine an exact time point for receiving and transmitting PPS signal to the synchronization subsystem (e.g., synchronization subsystem 130 of FIG. 1). More specifically, the system can determine an elapsed time period by calculating an offset value between a first time when the trigger signal including a Pulse Per Second (PPS) signal is received from a global navigation satellite system (GNSS) at a host circuit, and a second time when the PPS signal has been transmitted to the subsystem using a sequence of telemetry packets. The details of determining the elapsed time period are described above in connection with FIG. 4.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for generating synchronized trigger signals for controlling execution of a plurality of sensors, comprising:
    identifying a trigger signal by a processor on a circuit, the circuit being coupled to a plurality of groups of sensors, each group having one or more sensors and each sensor having a respective sensor type;
    generating, for each sensor in each group of the plurality of groups of sensors, a synchronized trigger signal using the identified trigger signal based at least on the respective sensor types, wherein the synchronized trigger signals, once received by corresponding sensors, cause the corresponding sensors to synchronously collect sensor data for a particular scene; and
    transmitting the synchronized trigger signals to corresponding sensors in the plurality of groups of sensors for controlling execution of data collection,
    wherein a first synchronized trigger signal for a first sensor in the plurality of groups of sensors has a different phase from a second synchronized trigger signal for a second sensor in the plurality of groups of sensors, wherein the phase difference is determined by the processor based on an elapsed time period for transmitting the first and second synchronized triggers signals to the first and second sensors, respectively.

2. The method of claim 1, wherein one group of the plurality of groups of sensors includes a first sensor with a first sensor type and a second sensor with a second sensor type, wherein the synchronized trigger signal for the first sensor and the synchronized trigger signal for the second sensor specify a respective frame rate, a respective phase, a respective pulse width, or a respective polarity for triggering sensor operations.

3. The method of claim 1, wherein identifying the trigger signal by the processor comprises:
    selecting, as the identified trigger signal, a signal received by the processor from a primary sensor in one group of the plurality of groups of sensors.

4. The method of claim 1, wherein identifying the trigger signal by the processor comprises:
    generating, as the identified trigger signal, a signal based on time data received by a global navigation satellite system (GNSS), wherein the received trigger signal includes a Pulse Per Second (PPS) signal.

5. The method of claim 1, wherein identifying the trigger signal by the processor comprises:
    generating the trigger signal by the processor according to a local timer or counter in the circuit.

6. The method of claim 1, wherein before generating synchronized trigger signals, the method further comprises:
    calibrating the identified trigger signal with a local timer or counter in the circuit.

7. The method of claim 1, wherein one of the synchronized trigger signals has a different frame rate, phase, polarity, or pulse width from the identified trigger signal.

8. The method of claim 1, wherein the respective sensor types comprise an image sensor, an audio sensor, or a laser sensor.

9. The method of claim 1, wherein one of the plurality of groups of sensors comprises at least one of (i) one or more cameras or (ii) one or more Light Detection and Ranging (LiDAR) sensors.

10. The method of claim 1, further comprising: calibrating the identified trigger signal across the plurality of groups of sensors using a local timer or counter in the circuit or a timestamp specified by a global navigation satellite system (GNSS).

11. The method of claim 1, wherein the identified trigger signal is a signal received from a primary sensor in a group of the plurality of groups of sensors, wherein transmitting the synchronized trigger signals to the corresponding sensors comprises:
    transmitting the synchronized trigger signals to worker sensors in one or more groups of the plurality of groups of sensors.

12. The method of claim 1, wherein the circuit includes a multiplexer unit for transmitting one of the synchronized trigger signal to a corresponding worker sensor, wherein the multiplexer unit is coupled to a first I2C primary-worker bus for a first synchronized trigger signal, and a second I2C primary-worker bus for a second synchronized trigger signal, wherein transmitting the synchronized trigger signals to the corresponding sensors comprises:
    receiving, at the multiplexer unit, a selection signal from a broadcast data bus; and
    selecting, based on the selection signal, one of the first synchronized trigger signal or the second synchronized trigger signal to transmit to the corresponding worker sensor.

13. The method of claim 1, further comprising determining an elapsed time period for signal transmission, the determining comprising:
    determining the elapsed time period by calculating an offset value between a first time when the trigger signal including a Pulse Per Second (PPS) signal is received from a global navigation satellite system (GNSS) and a second time when the PPS signal has been transmitted to a corresponding component in the circuit using a sequence of telemetry packets.

14. A system comprising one or more computers and one or more storage devices storing instructions that, when executed by one or more computers, cause the one or more computers to perform respective operations, the operations comprising:
   identifying a trigger signal by a processor on a circuit, the circuit being coupled to a plurality of groups of sensors, each group having one or more sensors and each sensor having a respective sensor type;
   generating, for each sensor in each group of the plurality of groups of sensors, a synchronized trigger signal using the identified trigger signal based at least on the respective sensor types, wherein the synchronized trigger signals, once received by corresponding sensors, cause the corresponding sensors to synchronously collect sensor data for a particular scene; and
   transmitting the synchronized trigger signals to corresponding sensors in the plurality of groups of sensors for controlling execution of data collection,
   wherein a first synchronized trigger signal for a first sensor in the plurality of groups of sensors has a different phase from a second synchronized trigger signal for a second sensor in the plurality of groups of sensors, wherein the phase difference is determined by the processor based on an elapsed time period for transmitting the first and second synchronized triggers signals to the first and second sensors, respectively.

15. The system of claim 14, wherein one group of the plurality of groups of sensors includes a first sensor with a first sensor type and a second sensor with a second sensor type, wherein the synchronized trigger signal for the first sensor and the synchronized trigger signal for the second sensor specify a respective frame rate, a respective phase, a respective pulse width, or a respective polarity for triggering sensor operations.

16. The system of claim 14, wherein identifying the trigger signal by the processor comprises:
   selecting, as the identified trigger signal, a signal received by the processor from a primary sensor in one group of the plurality of groups of sensors.

17. One or more non-transitory computer-readable storage media storing instructions that, when executed by one or more computers, cause the one or more computers to perform respective operations, the operations comprising:
   identifying a trigger signal by a processor on a circuit, the circuit being coupled to a plurality of groups of sensors, each group having one or more sensors and each sensor having a respective sensor type;
   generating, for each sensor in each group of the plurality of groups of sensors, a synchronized trigger signal using the identified trigger signal based at least on the respective sensor types, wherein the synchronized trigger signals, once received by corresponding sensors, cause the corresponding sensors to synchronously collect sensor data for a particular scene; and
   transmitting the synchronized trigger signals to corresponding sensors in the plurality of groups of sensors for controlling execution of data collection,
   wherein a first synchronized trigger signal for a first sensor in the plurality of groups of sensors has a different phase from a second synchronized trigger signal for a second sensor in the plurality of groups of sensors, wherein the phase difference is determined by the processor based on an elapsed time period for transmitting the first and second synchronized triggers signals to the first and second sensors, respectively.

18. The one or more non-transitory computer-readable storage media of claim 17, wherein one group of the plurality of groups of sensors includes a first sensor with a first sensor type and a second sensor with a second sensor type, wherein the synchronized trigger signal for the first sensor and the synchronized trigger signal for the second sensor specify a respective frame rate, a respective phase, a respective pulse width, or a respective polarity for triggering sensor operations.

19. The one or more non-transitory computer-readable storage media of claim 17, wherein identifying the trigger signal by the processor comprises:
   selecting, as the identified trigger signal, a signal received by the processor from a primary sensor in one group of the plurality of groups of sensors.

* * * * *